United States Patent
Butter

[15] 3,700,706
[45] Oct. 24, 1972

[54] SELECTIVE CARBONYLATION OF OLEFINICALLY UNSATURATED HYDROCARBONS USING PALLADIUM-PHOSPHINE CATALYSTS PROMOTED WITH TIN SALTS

[72] Inventor: Stephen A. Butter, Boundbrook, N.J.

[73] Assignee: Mobil Oil Corporation

[22] Filed: Aug. 17, 1970

[21] Appl. No.: 64,631

Related U.S. Application Data

[63] Continuation-in-part of Ser. No. 13,170, Feb. 20, 1970, abandoned.

[52] U.S. Cl............260/410.9 R, 260/408, 260/413, 260/410.5, 260/468 CB, 260/485 L, 260/485 R, 260/486 AC, 260/497 A, 260/514 C, 260/533 A, 260/544 A
[51] Int. Cl.............................................C07c 51/14
[58] Field of Search.......................260/410.9 R, 413, 410.5, 497 A, 260/533 A, 468 CB, 514 CO, 514 CA

[56] References Cited

UNITED STATES PATENTS

| | | | |
|---|---|---|---|
| 2,876,254 | 5/1959 | Jenner et al. | 260/486 |
| 3,437,676 | 4/1969 | von Kutepow et al. | 260/468 |
| 2,963,499 | 12/1960 | Aldridge et al. | 260/410.9 |

*Primary Examiner*—Lewis Gotts
*Assistant Examiner*—Diana G. Rivers
*Attorney*—Oswald G. Hayes, Andrew L. Gaboriault and Mitchell G. Condos

[57] ABSTRACT

A carbonylation process is provided for conversion of olefinically unsaturated hydrocarbons to a mixture of esters or acids with an increased ratio of normal:iso (i.e., straight:branched) ester or acid by reaction with carbon monoxide and a hydroxylic compound, said process being carried out in the presence of a palladium salt complexed with a phosphine ligand as a catalyst and tin cocatalysts or promoters. For example, the catalyst may be palladium dichloride bis (triphenylphosphine) and the tin cocatalyst or promoter present may be stannous chloride dihydrate.

13 Claims, No Drawings

SELECTIVE CARBONYLATION OF OLEFINICALLY UNSATURATED HYDROCARBONS USING PALLADIUM-PHOSPHINE CATALYSTS PROMOTED WITH TIN SALTS

CROSS-REFERENCE TO RELATED APPLICATIONS

This is a continuation-in-part of application Ser. No. 13,170, filed Feb. 20, 1970 now abandoned.

BACKGROUND OF THE INVENTION

I. Field of the Invention

This invention relates to a process of carbonylation of olefinically unsaturated hydrocarbons to a mixture of esters or acids with an increased ratio of normal:iso ester or acid, said process being carried out in the presence of a palladium salt complexed with a phosphine ligand as a catalyst accompanied by a tin cocatalyst or promoter. More particularly, it relates to a process of carbonylation of olefinically unsaturated hydrocarbons by reaction with carbon monoxide and a hydroxylic compound in the presence of the above catalyst and cocatalyst or promoter to yield a mixture of esters or acids with an increased ratio of normal:iso ester or acid.

II. Description of the Prior Art

It is generally known that olefins, carbon monoxide and alcohols or water may be combined to form carboxylic acids or esters using catalysts based on group VIII metals which form carbonyls.

Early carbonylation processes based on nickel catalysts utilized vigorous reaction conditions and were accompanied by side reactions (W. Reepe, Liebigs Ann. Chem. 582, 1 [1953]). Octacarbonyldicobalt has also been used to form carboxylic acids (R. Ercoll, Das 1092015, [1957] Montecatini).

There is also known a carbonylation process conducted under mild conditions with minimum byproduct formation which is based on palladium complex salts as catalysts, examples of which include palladium catalysts containing phosphines, phosphites, ammonia, amines, nitriles, and unsaturated hydrocarbons as ligands(von Kutepow, et al, U.S. Pat. No. 3,437,676), but with no tin or other cocatalysts or promoters present.

Also, the use of palladium dichloride in an alcoholic solution of hydrogen chloride is known to convert olefins into esters (J. Tsuji, et al, Tetrahedron Letters (1963) 1437).

In prior art known to the inventor, carbonylation of terminal olefins such as propylene results in mixtures of esters or acids such that the ratio normal:iso is usually about 0.33:1 to about 0.50:1.

SUMMARY OF THE INVENTION

In accordance with this invention, there is provided a carbonylation process using a palladium salt complexed with a phosphine ligand as a catalyst and a tin cocatalyst or promoter in which olefinically unsaturated hydrocarbons are converted to a mixture of esters or acids with an increased ratio of normal:iso ester or acid by reaction with carbon monoxide and a hydroxylic compound.

DESCRIPTION OF SPECIFIC EMBODIMENTS

In prior art carbonylation processes employing catalysts such as palladium-phosphines without tin cocatalysts or promoters, carbonylation of olefinically unsaturated hydrocarbons such as propylene and isobutylene with carbon monoxide and an alcohol has resulted in mixtures of esters with a ratio 0.33:1 to about 0.50:1, normal:iso ester.

In the present invention a carbonylation process utilizing a palladium-phosphine complex in combination with a tin cocatalyst or promoter provides carbonylation, as in the case of propylene, to butyric acid esters (e.g., methyl isobutyrate and methyl-n-butyrate) with the ratio of normal: iso ester generally better than 0.67:1 and in certain selected cases about 4:1.

Non-limiting examples of the olefinically unsaturated hydrocarbons which may be carbonylated according to the present invention are: ethylene, propylene, butenes, pentenes, hexenes, octenes, tetradecenes, octadecenes, cycloolefins, dienes such as butadiene, and trienes and, in more general aspect, olefinically unsaturated hydrocarbons of from two to 30 carbon atoms.

Hydroxylic compounds may be used, if desired, in practice of the present invention. If a hydroxylic compound is used in the carbonylation process of the present invention, it may be one of several possibilities with the end product type being determined by the compound used. If alcohol is used, an ester is formed by the present process. If water is used, the product is an acid. Phenols may be used with the products being esters. If no hydroxylic media is used, the products may be acyl halides.

Additionally, a solvent may be used, if desired, in the process of the present invention. However, the use of a suitable solvent is preferred. Non-limiting examples of solvents which may be used are: alcohols, ketones, esters, ethers, and aliphatic, aromatic and heterocyclic hydrocarbons and other materials inert under the conditions of practice of the present process.

If a solvent is used in the process of the present invention, an important factor to be considered in the selection of one to be suitable for the particular carbonylation reaction in question is the boiling point increment between the solvent and the product. For example, p-xylene is a preferred solvent in the reaction which yields methyl butyrate esters since these esters boil 25°–35°C. below the solvent. This boiling point difference enables efficient separation of the solvent and product by simple distillation.

The reaction temperature during the process of the present invention may be varied over a rather wide range and, for example, in the range of from about 20°C. to about 200°C. Temperatures between 60°C. and 100°C. are preferred.

The catalyst concentrations used in the present invention may be varied over a wide range. However, a concentration varying from as low as 0.001 percent up to about 50 percent or more, is useful with the range of from about 0.1 to about 5 percent (based on the weight of the unsaturated hydrocarbon reactant) being preferred. The cocatalyst or promoter concentrations used in the present invention may be in a mole ratio of between 0.5:1 to 100:1, cocatalyst or promoter:catalyst, with ratios between 0.5:1 to 10:1 being preferred.

The process according to the present invention may be carried out under pressure sufficient to maintain a liquid phase with regard to the reactants. Depending upon the reactants used (i.e., the olefinically unsaturated hydrocarbon and hydroxylic compound), the pressure may vary between atmospheric to about 10,000 psig. In general, pressures of from about 50 to about 1,500 psig. are preferred and used.

In the practice of the carbonylation process of the present invention, the olefinically unsaturated hydrocarbon is reacted with carbon monoxide and a suitable hydroxylic compound, e.g., an alcohol, in the presence of a catalyst of the formula $L_m PdX_y$, wherein L is an organo-phosphine and X is an acid function, and a tin cocatalyst or promoter.

The tin cocatalyst or promoter to be present in the reaction may be of several and varied organic or inorganic forms. Non-limiting examples of tin compounds which may be used include stannous chloride dihydrate, anhydrous stannous chloride, stannic chloride pentahydrate, and triphenyltin chloride. The yield of normal (straight chain) product is increased in the present invention as the tin moity is made more electronegative according to the series $\phi_3 SnCl < SnCl_2 < SnCl_4$.

The above-mentioned acid function, X, of the catalyst of the process of the present invention may be any one of several acid functions with halide radicals and particularly the chloride radical preferred. NOn-limiting examples of acid functions which may be present in the catalyst of the present invention include chloride, bromide, iodide, sulfate, phosphate, acetate, nitrate, propionate, borate, and others.

Excess amounts of phosphine ligand over that amount required to form the complex and excess amounts of tin cocatalyst or promoter are used in certain instances to stabilize the catalyst and, in some cases, with obtainment of increased yield of desired product.

The use of tin modified palladium catalysts, e.g., palladium-phosphine catalysts with a tin cocatalyst or promoter, is valuable for directing the course of carbon monoxide addition to olefinic double-bond and is, therefore, particularly useful for preparing straight chain acids and esters such as methyl-n-butyrate from propylene.

The reaction may be carried out in the presence, if desired, of hydrohalic acids, particularly of hydrogen chloride. It is advantageous to have hydrohalic acids present because lower temperatures may then be used at a given catalyst concentration, or lower catalyst concentrations at a given temperature. The acids are generally used in amounts of up to 10 percent by weight with reference to the whole of the initial materials. They may be used in alcoholic or aqueous solution, but optionally also in pure form.

The following examples illustrate the process of the present invention. The example results are summarized in the Table immediately following the examples.

EXAMPLE 1

A 300 cc. Hastelloy autoclave was charged with 0.50 g. palladium dichloride-bis(triphenylphosphine), 0.32 g. stannous chloride dihydrate, 2.3 g. hydrochloric acid and 80.0 g. of methanol. Liquid propylene (6.6 g.) was pumped in and stirring was started. The temperature was raised to 91°C. and the system pressured with carbon monoxide to 1,000 psig. The reaction mixture was cooled after 3 hours and the products were distilled and analyzed by gas chromatography. The yield based on reacted propylene was practically quantitative and consisted of 7.9 g. of methyl-n-butyrate and methyl-isobutyrate in a ratio of 50 parts to 50 parts.

EXAMPLE 2

Following the procedure of Example 1, 23.1 g. of propylene was added to 0.50 g. palladium dichloride bis(triphenylphosphine), 0.67 g. stannous chloride dihydrate, 2 g. hydrochloric acid, and 27.4 g. methanol in 43.1 g. p-xylene. The autoclave was heated to 92°C. and carbon monoxide added to maintain a total pressure of approximately 900 psig. After 3.3 hours during which time 960 psi was absorbed, the mixture was cooled and products analyzed showing 48.4 g. of methyl butyrate esters were formed in a ratio of 66 parts straight-chain to 34 parts branched.

EXAMPLE 3

Following the procedure in Example 1, 20.0 g. propylene was added to 0.5 g. palladium dichloride bis(triphenylphosphine), 2. g. hydrochloric acid and 27.4 g. methanol in 43.1 g. p-xylene. Carbon monoxide was added at 92°C. to maintain a total pressure of approximately 900 psi. After 3.3 hours, the products consisted of 42.5 of methyl butyrate esters in a ratio of 43 parts straight-chain to 57 parts branched.

EXAMPLE 4

The procedure of Example 1 was followed and 27.0 g. propylene was added to 0.50 g. palladium dichloride bis(triphenylphosphine), 0.50 g. anhydrous stannous chloride, 0.10 g. hydrogen chloride and 22.7 g. methanol in 43.1 g. p-xylene. The temperature was 80°C. and carbon monoxide replenished to maintain a pressure of approximately 900 psig for 6 hours. The product consisted of 31 g. of methyl butyrate esters in a straight:branched ester ratio of 72:28 parts.

EXAMPLE 5

Following the procedure of Example 1, 20 g. propylene was added to 0.50 g. palladium dichloride bis(triphenylphosphine), 0.1 g. hydrogen chloride, 1.82 g. triphenylphosphine, 20.6 g. methanol in 43.1 g. p-xylene. Carbon monoxide was added to 1,000 psig at 80°C. for 6 hours. The yield of methyl butyrate esters was approximately 1 percent and selectivity was 75 parts straight to 25 parts branched ester.

EXAMPLE 6

Following the procedure of Example 1, the autoclave was charged with 20 g. propylene, 20.6 g. methanol, 0.3 g. hydrogen chloride, 1.82 g. triphenylphosphine, 0.5 g. palladium dichloride bis(triphenylphosphine), 0.25 g. stannic chloride pentahydrate and 43.1 g. p-xylene. At 90°C. and 1,000 psig carbon monoxide pressure (total), 2 grams of ester product were formed in 6 hours. The ratio of straight-chain to branched ester was 81 parts to 19 parts.

EXAMPLE 7

Following the procedure of Example 1, the charge consisted of 20 g. propylene, 22.7 g. methanol, 0.50 g. palladium dichloride bis(triphenylphosphine), and 0.18 g. stannic chloride in 43.1 g. p-xylene. Carbon monoxide was added to maintain a pressure of approximately 900 psig. at 90°C. for 5 hours. The product consisted of 22.4 g. methyl butyrate esters, 75 parts straight-chain and 25 parts branched.

EXAMPLE 8

Following the procedure of Example 1, the autoclave was charged with 20 g. propylene, 27.4 g. methanol 0.50 g. palladium dichloride bis(triphenylphosphine), 0.41 g. triphenyltin chloride, 2. g. hydrochloric acid and 43.1 g. p-xylene. Carbon monoxide was added for a total pressure of 980 psig. at 95°C. After 3 hours, 34.5 ester product were formed in a straight:branched ratio of 49:51 parts.

EXAMPLE 9

The procedure of Example 1 was followed and 26.9 g. 1-butene was added to 0.56 g. palladium dichloride bis(triphenylphosphine), 0.10 g. hydrogen chloride and 12.8 g. methanol in 40.0 g. p-xylene. The temperature was 90°C. and carbon monoxide replenished to maintain a pressure of approximately 800 psig for 2 hours. The product consisted of 38.8 g. of esters in a straight:branched ester ratio of 43:57 parts.

EXAMPLE 10

Following the procedure of Example 1, 12.1 g. 1-butene was added to 0.52 g. palladium dichloride bis(triphenylphosphine), 0.57 g. anhydrous stannous chloride, 0.1 g. hydrogen chloride, 12.8 g. methanol in 40.0 g. p-xylene. Carbon monoxide was added to approximately 800 psig. at 85°C. for 4 hours. The yield of esters was approximately 85 percent and selectivity was 71 parts straight to 29 parts branched ester.

EXAMPLE 11

Following the procedure of Example 1, the autoclave was charged with 28 g. 1-pentene, 12.8 g. methanol, 0.1 g. hydrogen chloride, 0.5 g. palladium dichloride bis(triphenylphosphine), and 40.0 g. tetradecane. At 85°C. and about 900 psig carbon monoxide pressure (total), 15.49 g. of ester product were formed in 4.5 hours. The ratio of straight-chain to branched ester was 69 parts to 31 parts.

EXAMPLE 12

Following the procedure of Example 1, the charge consisted of 28.7 g. 1-pentene, 12.8 g. methanol, 0.53 g. palladium dichloride bis(triphenylphosphine), 0.1 g. hydrogen chloride, and 0.54 g. anhydrous stannous chloride in 40.0 g. tetradecane. Carbon monoxide was added to maintain a pressure of approximately 900 psig. at 85°C. for 3 hours. The product consisted of 16.2 g. esters, 89 parts straight-chain and 11 parts branched.

EXAMPLE 13

Following the procedure of Example 1, the autoclave was charged with 28 g. 2-pentene, 12.8 g. methanol, 0.55 g. palladium dichloride bis(triphenylphosphine), 0.1 g. hydrogen chloride and 40 g. tetradecane. Carbon monoxide was added for a pressure of about 900 psig. at 85°C. After 6 hours, 10.2 g. ester product were formed in a straight:branched ratio of 8:92 parts.

EXAMPLE 14

The procedure of Example 1 was followed and 28.0 g. 2-pentene was added to 0.55 g. palladium dichloride bis(triphenylphosphine), 1.06 g. anhydrous stannous chloride, 0.10 g. hydrogen chloride and 12.8 g. methanol in 40.0 g. tetradecane. The temperature was 85°C. and carbon monoxide replenished to maintain a pressure of approximately 900 psig for 2.25 hours. The product consisted of 16.4 g. of esters in a straight:branched ester ratio of 30:70 parts.

EXAMPLE 15

Following the procedure of Example 1, 27.7 g. 1-hexene was added to 0.50 g. palladium dichloride bis(triphenylphosphine), 0.1 g. hydrogen chloride, and 10.4 g. methanol. Carbon monoxide was added to about 900 psig. at 90°C. for 2 hours. The yield of esters was approximately 72 percent and selectivity was 62 parts straight to 38 parts branched ester.

EXAMPLE 16

Following the procedure of Example 1, the autoclave was charged with 34 g. 1-hexene, 12.8 g. methanol, 0.1 g. hydrogen chloride, 0.51 g. palladium dichloride bis(triphenyl-phosphine), and 0.51 g. anhydrous stannous chloride. At 90° C. and about 900 psig carbon monoxide pressure (total), 26.9 g. of ester product were formed in straight-chain hours. The ratio of straight-chain to branched ester was 86 parts to 14 parts.

EXAMPLE 17

Following the procedure of Example 1, the charge consisted of 45 g. 1-octene, 12.8 g. methanol, 0.52 g. palladium dichloride bis(triphenylphosphine) and 0.1 g. hydrogen chloride. Carbon monoxide was added to maintain a pressure of approximately 900 psig at 80°C. The product consisted of 19.7 g. esters, 68 parts straight-chain and 32 parts branched.

EXAMPLE 18

Following the procedure of Example 1, the autoclave was charged with 90 g. 1-octene, 32 g. methanol, 1.28 g. palladium dichloride bis(triphenylphosphine), 1.24 g. anhydrous stannous chloride and 0.25 g. hydrogen chloride. Carbon monoxide was added for a total pressure of about 800 psig. at 80° C. After 3 hours, 94.2 g. ester product were formed in a straight:branched ratio of 86:14 parts.

EXAMPLE 19

The procedure of Example 1 was followed and 17.0 g. cis-2-hexene was added to 0.50 g. palladium dichloride bis(triphenylphosphine), 0.75 g. anhydrous stannous chloride, 0.10 g. hydrogen chloride and 6.4 g. methanol in 40.0 g. tetradecane. The temperature was 95°C. and carbon monoxide replenished to maintain a pressure of approximately 900 psig for 0.5 hour. The product consisted of 4.4 g. of esters in a straight:branched ester ratio of 38:62 parts.

EXAMPLE 20

The procedure of Example 1 was followed and 57.0 g. total of mixed unsaturated hydrocarbons (i.e., 17.0 g. 1-hexene and 40.0 g. 1-tetradecene) was added to 0.38 g. palladium dichloride bis(triphenylphosphine), 0.56 g. anhydrous stannous chloride, 0.1 g. hydrogen chloride and 6.4 g. methanol. The temperature was 90°C. and carbon monoxide replenished to maintain a pressure of about 1,000 psig for 1.5 hours. The product consisted of 7 g. total of esters (i.e., 2.4 g. $C_7$ esters and 4.6 g. $C_{15}$ esters) in a straight:branched ester ratio of 89:11 for the $C_7$ esters and 88:12 for the $C_{15}$ esters.

EXAMPLE The procedure of Example 1 was followed and 101.0 g. 1-octadecene was added to 0.5 g. palladium dichloride bis(triphenylphosphine), 0.75 g. anhydrous stannous chloride, 0.45 g. triphenylphosphine, 0.1 g. hydrogen chloride, and 12.8 g. methanol in 20.0 g. tetradecane. At 95°C., carbon monoxide was added to maintain a pressure of approximately 900 psig. After five hours, 53.3 g. of nonadecanoic acid esters were formed in a straight:branched ratio of 92:8 parts.

ple 3 shows that the use of a catalyst with a triphenylphosphine ligand and no tin cocatalyst or promoter gives a low 0.75:1 ratio of normal:iso product. Of the examples under about the same conditions and also using a solvent (i.e., Examples 2, 4, 7 and 8) with the same catalyst and a tin cocatalyst or promoter, the ratios range from 0.96:1 to 3:1. The use of extra triphenylphosphine in the reaction mixture (i.e., Example 5) increases the ratio, also, but at great expense in rate of reaction and lowered conversion. However, using the same amount of extra triphenylphosphine plus a tin cocatalyst or promoter significantly increase the ratio above even that value (e.g., Example 6 compared to Example 5). Examples 9 through 18 also show the effect of the presence of a tin cocatalyst or promoter on the carbonylation process involving higher unsaturated hydrocarbons. In each case, products with a higher ratio of normal:iso ester or acid are provided when the tin cocatalyst or promoter is present.

What is claimed is:

1. In a liquid phase process for the carbonylation of olefinically unsaturated hydrocarbon compounds to carbonyl-containing compounds by reacting the olefinically unsaturated hydrocarbon compound with carbon monoxide and with a hydroxylic compound selected from the group consisting of alcohol, phenol and water in the presence of a palladium salt catalyst having the formula $L_mP_dX_y$ in which L is an organic phosphine, X is an acid function selected from the group consisting of halide, sulfate, phosphate, acetate,

TABLE.—CARBONYLATION OF OLEFINS

| Example number | Olefin | Cocatalyst | Percent conversion/hrs. [1] | Mole ratio of co-catalyst: catalyst [4] | Selectivity, normal: ISO weight ratio |
|---|---|---|---|---|---|
| 1 | Propylene | Stannous chloride dihydrate | 46/3 | 2:1 | 1:1 |
| 2 | do | do | 87/3.3 | 4:1 | 1.9:1 |
| 3 | do | None | 89/3.3 | | 0.75:1 |
| 4 | do | Anhydrous stannous chloride | [2] 64/6 | 3.7:1 | 2.6:1 |
| 5 | do | Triphenylphosphine | [2] 1/6 | 10:1 | 3:1 |
| 6 | do | Triphenylphosphine/stannic chloride pentahydrate | 4/6 | [3] 11:1 | 4.3:1 |
| 7 | do | Anhydrous stannic chloride | 46/5 | 1:1 | 3:1 |
| 8 | do | Triphenyltin chloride | 72/3 | 1.5:1 | 0.96:1 |
| 9 | 1-butene | None | 83/2 | | 0.75:1 |
| 10 | do | Anhydrous stannous chloride | [2] 85/4 | 4:1 | 2.45:1 |
| 11 | 1-pentene | None | [2] 55/4.5 | | 2.3:1 |
| 12 | do | Anhydrous stannous chloride | [2] 30/3 | 4:1 | 8.4:1 |
| 13 | 2-pentene | None | [2] 20/6 | | 0.09:1 |
| 14 | do | Anhydrous stannous chloride | [2] 32/2.25 | 7:1 | 0.43:1 |
| 15 | 1-hexene | None | 72/2 | | 1.6:1 |
| 16 | do | Anhydrous stannous chloride | 46/1.75 | 3.8:1 | 6.2:1 |
| 17 | 1-octene | None | [5] 2.49 | | 2.1:1 |
| 18 | do | Anhydrous stannous chloride | [2] 68/3 | 2.7:1 | 6.2:1 |
| 19 | cis-2-hexene | do | 15/0.6 | 5.5:1 | 0.61:1 |
| 20 [6] | 1-hexene/1-tetradecene | do | 20/1.5 | 5.5:1 | [7] 8.1:1 [8] 8.0:1 |
| 21 | 1-octadecene | do | 43/5 | 5:1 | 11.5:1 |

Notes:
[1] Temperature=90–95° C.
[2] Temperature=80–85° C.
[3] 1 mole tin salt/10 moles triphenylphosphine/1 mole catalyst.
[4] Catalyst=palladium dichloride bis(triphenylphosphine).
[5] This preparation was allowed to proceed overnight.
[6] The mixture of olefins was in a mole ratio of 1:1.
[7] For $C_7$.
[8] For $C_{15}$.

As will be noted from the data of the examples as set forth herein, the carbonylation process of the present invention provides products with a higher ratio of normal: iso ester or acid when an appropriate hydroxylic compound such as an alcohol or water is reacted with an olefin and carbon monoxide. Of the examples employing an appropriate solvent (i.e., p-xylene), Examnitrate, propionate and borate, m is an integer of from 1 to 4, inclusive, and y is an integer of 1 or 2, the sum of m+y being an integer of from 2 to 6, inclusive, the improvement which comprises using a tin cocatalyst or promoter selected from the group consisting of inorganic tin chlorides and triphenyltin chloride in an amount sufficient to increase the ratio of straight chain to branched chain compounds in the reaction product.

2. A process as defined in claim 1, wherein the temperature is from about 20°C. to about 200°C.

3. A process as defined in claim 1, wherein the hydroxylic compound is an alcohol and the temperature is from about 60°C. to about 100°C.

4. A process as defined in claim 1, wherein the olefinically unsaturated hydrocarbon has from two to 30 carbon atoms.

5. A process as defined in claim 1, wherein the olefinically unsaturated hydrocarbon reactant is a physical mixture of two or more olefinically unsaturated hydrocarbons.

6. A process as defined in claim 4, wherein the hydroxylic compound is an alcohol and the temperature is from about 60°C. to about 100°C.

7. A process as defined in claim 4, wherein the acid function is a halide.

8. A process as defined in claim 7, wherein the acid function is chloride.

9. A process as defined in claim 4, wherein the tin cocatalyst or promoter is stannous chloride dihydrate.

10. A process as defined in claim 4, wherein the tin cocatalyst or promoter is anhydrous stannous chloride.

11. A process as defined in claim 4, wherein the tin cocatalyst or promoter is stannic chloride pentahydrate.

12. A process as defined in claim 4, wherein the tin cocatalyst or promoter is stannic chloride.

13. A process as defined in claim 4, wherein the tin cocatalyst or promoter is triphenyltin chloride.

* * * * *

UNITED STATES PATENT OFFICE
CERTIFICATE OF CORRECTION

Patent No. 3700706  Dated October 24, 1972

Inventor(s) Stephen A. Butter

It is certified that error appears in the above-identified patent and that said Letters Patent are hereby corrected as shown below:

Col. 5, Line 19, "34.5" should read -- 34.5 g. --

Col. 6, Line 40, "straight-chain hours" should read -- 1.75 hours --

Col. 7, Line 22, "Example" should be centered as -- Example 21 --

Col. 7 & 8
(TABLE)
col. 4, line 19, "15/0.6" should read -- 15/0.5 --

Signed and sealed this 6th day of March 1973.

(SEAL)
Attest:

EDWARD M. FLETCHER, JR.
Attesting Officer

ROBERT GOTTSCHALK
Commissioner of Patents

Notice of Adverse Decision in Interference

In Interference No. 98,553, involving Patent No. 3,700,706, S. A. Butter, SELECTIVE CARBONYLATION OF OLEFINICALLY UNSATURATED HYDROCARBONS USING PALLADIUMPHOSPHINE CATALYSTS PROMOTED WITH TIN SALTS, final judgment adverse to the patentee was rendered Feb. 11, 1976, as to claims 1, 2, 3, 4, 6, 7, 8 and 9.

[*Official Gazette September 20, 1977.*]